United States Patent [19]

Laufer

[11] Patent Number: 5,106,643

[45] Date of Patent: Apr. 21, 1992

[54] MILK PREPARATIONS

[76] Inventor: Wolfgang Laufer, Hauptstrasse 27, D-8130 Starnberg, Fed. Rep. of Germany

[21] Appl. No.: 387,384

[22] Filed: Jul. 27, 1989

[30] Foreign Application Priority Data

Feb. 21, 1984 [CH] Switzerland .............................. 818/84

Related U.S. Application Data

[63] Continuation of Ser. No. 104,600, Sep. 29, 1987, abandoned, which is a continuation of Ser. No. 793,692, filed as PCT/EP85/00060, Feb. 21, 1985, abandoned.

[51] Int. Cl.$^5$ .............................................. A23C 9/00
[52] U.S. Cl. .................................... 426/5.65; 426/580; 426/581; 426/582; 426/583; 426/584; 426/585; 426/615; 426/641; 426/656; 426/657; 426/658; 426/518; 426/524
[58] Field of Search ........................... 426/34, 580–585, 426/574, 656, 657, 565, 615, 646, 641, 524, 658, 518

[56] References Cited

U.S. PATENT DOCUMENTS

| | | | |
|---|---|---|---|
| 2,560,621 | 7/1951 | Wrenshall | 426/574 |
| 2,565,098 | 8/1951 | Sharp et al. | 426/37 |
| 3,403,031 | 9/1968 | Holmes | 426/565 |
| 4,305,969 | 12/1981 | Munk | 426/583 |
| 4,320,152 | 3/1982 | Fradin | 426/646 |
| 4,504,515 | 3/1985 | Hohenester | 426/646 |

FOREIGN PATENT DOCUMENTS

2639177 3/1978 Fed. Rep. of Germany .
1350547 6/1974 United Kingdom .

OTHER PUBLICATIONS

Ozimek et al., "Influence of an Addition of Textured Milk Proteins Upon Physiochemical Properties of Meat Mixtures", Journal of Food Science, vol. 47 (1981), pp. 234–239.

Arbuckle, Ice Cream, Third Ed. AVI Publishing Company, Inc. CT, 1977, pp. 389–390.

*Primary Examiner*—Marianne Cintins
*Attorney, Agent, or Firm*—Frishauf, Holtz, Goodman & Woodward

[57] ABSTRACT

A process for preparing food products having adjustable energy and nutritional values which comprises, in that sequence, (a) preparing an emulsion of a milk product such as whole milk, nonfat milk, powdered milk and the like, (b) freezing this emulsion and (c) then thoroughly and intimately admixing this frozen emulsion with a meat, fish, vegetable, grain, fruit, cheese etc. product. By suitable selection and adjustment one to the other of the milk component with the other component, products having different caloric and energy values can be obtained. These products are distinguished by fine taste, texture and stability.

20 Claims, 1 Drawing Sheet

MILK PREPARATIONS

This application is a continuation of Ser. No. 104,600, filed Sept. 28, 1987, now abandoned, which is a continuation of application Ser. No. 793,692, filed as PCT/EP85/00060, Feb. 21, 1985, now abandoned.

This invention relates to novel milk preparations (abbreviated as "MP" products, for "milk preparation" products) having an adjustable energy and nutritional value and with improved digestibility, which are produced by an innovative manufacturing process. With the aid of this novel manufacturing process, herein called the "MP process", a widely diversified product group can be made from substantially milk-based foodstuffs.

The composition and calorie content of the novel milk preparations can be programmed as desired by the selection and preparation of the starting ingredients, so that not only high-calorie but also low-calorie products can be made, which in either case always have a high nutritional value.

One preferred product group within the scope of the novel MP products is distinguished by a very low fat content and a greatly reduced caloric value (low-calorie MP products) in relation to comparable products on the market.

The basis for the idea, concept and development of the MP products was the fact that in some industrial nations an average of over 50% of the population is overweight and suffers from the health problems associated with obesity; many of these consumers would like to lose weight, but do not wish to change the amount of food they eat or do without the enjoyment eating gives them. In this respect, an important factor was and is that over the past 12 years, despite diverse recommendations for healthful nutrition, total fat consumption remains at an unchanged high level. This is in turn primarily due to a high intake of hidden fats in sausage and meat products, these fats being masked by the manufacturing and preparation process.

With the MP products, novel, primarily low-calorie and reduced-fat foodstuffs having an improved nutritional value are provided, which nevertheless correspond to comparable products on the market in terms of their appearance, taste and consistency, and which are produced by means of an innovative biotechnological manufacturing process.

One preferred product group within the scope of the novel MP products is distinguished by a very low fat content (approximately 3-7 g per 100 g) and a highly reduced caloric value (approximately 80-130 kcal per 100 g) as compared with comparable products available on the market. With the MP manufacturing process, it is largely possible to maintain the great variety now found in conventional food products.

The MP products made using the novel technology, which are diversified and balanced in terms of their nutritional value and active ingredients, are largely natural, because no chemically prepared raw materials or chemically produced additives are used.

It is known that consumers who are increasingly aware of health considerations have rising expectations in terms of quality, despite a stagnating income. The MP products are particularly responsive to the consumer's desire for low-calorie products made from meat and milk ingredients which nevertheless are equivalent in nutritional value and taste.

From the economic standpoint, a substantially higher consumption of milk and meat products is to be expected, and manufacture at a favorable cost remains assured.

The products made by the novel MP process are particularly well suited to carrying out public health policies, because they can be targeted for primarily preventive use in health maintenance and health education. It has been demonstrated that diet-related illnesses are either partly or entirely responsible for the majority of mortality (approximately 50% of all deaths). The cost to the public of the consequences of diet-related illnesses is very high, and in the Federal Republic of Germany, for instance, this cost is believed to have risen to over 40 billion DM.

The primary consideration in devising and marketing the MP products is accordingly a considerable and justifiable interest on the part of the consumer in being offered foodstuffs, especially milk-and-meat-based products, which are low in calories and at the same time nutritionally improved yet inexpensive, in the place of conventional, basically fat-and-meat based products.

There is also a considerable public interest—especially on the part of taxpayers—in the manufacture and marketing of foodstuffs on the order of the MP products which could be significant both for public health and for the economy. Corrected eating habits will certainly bring about a considerable drop in health costs.

Both the MP products and the MP technology, in the form of specialized modifications, are of particular significance when used in food aid projects and in agricultural and nutritional development programs.

The novel MP technology can also be used to manufacture novel feeds for animals and fish.

The following tables provide an overview of the MP products;

Table I is an overview of their general characteristics and depending on the modification of their composition and on the process used as reflected in their energy nutritional value adjustment and low calorie and low fat modification.

Table II is an overview of possible food compositions and their areas of utilization; and Table III is a comparison of the fat, protein and carbohydrate contents, the corresponding energy contents and the cholesterol contents of conventional sausage, fresh meat and MP products.

| MP PRODUCTS: OVERVIEW | | |
|---|---|---|
| General Characteristics | Modification | Special Characteristics |
| Programmable, diversified compositions possible, primarily on a milk-and-meat basis High biological value due to complex compositions No chemical additives, no use of chemically treated substances such as binders, emulsifiers, preserva- | ENA | - Adjustable energy and nutritional value<br>- Accurately adjustable composition to meet physiological nutritional and/or regional needs, using local raw materials<br>- Good digestibility due to curing of individual ingredients<br>- Especially for use in underdeveloped and developing countries with inadequate food |

| MP PRODUCTS: OVERVIEW | | |
|---|---|---|
| General Characteristics | Modification | Special Characteristics |
| tives, etc. | | and malnutrition |
| Manufacture of products similar to sausages known as Bruhwurst and Kochwurst and milk products | LCLF | - Low in calories, fat and cholesterol; approximately 80-140 kcal, approximately 3.5 g of fat and 30-35 mg of cholesterol |
| Taste and consistency similar to comparable conventional products | | per 100 g of MP product<br>- Better-balanced, nutritionally better |
| Manufacture in the form of fresh, canned or dried products | | composition (as compared with conventional milk and sausage products) |
| Salable both as general food products and special diet products | | - Opportunities for replacing saturated fatty acids with unsaturated fatty acids |
| Utilization of surplus milk and beef products | | - Reduced NaCl content, increased CaCl content |
| Economical products<br>Improved keeping quality | | - Especially for use in countries with generally excessive food intake and faulty eating habits |

TABLE II

Overview of Possible Food Compositions of MP Products

A. Low-calorie, low-fat standard MP modifications (LCLF) (used as reduced-energy, low-energy mixed diet, approximating normal food).
1. Proteins, fats, carbohydrates, vitamins, minerals and trace elements in the beef, pork and/or other meat ingredients (preferably lean meat).
2. Proteins, fats, carbohydrates, vitamins, minerals and trace elements in the milk ingredients (preferably nonfat milk).

B. Energy- and nutritional-value adjustable MP modifications (ENA) (used as need-responsive, adjustable-need, energy-adjusted mixed diet, or as a diet food specifically adjusted in terms of its ingredients).
1. Proteins, fats, carbohydrates, vitamins, minerals and trace elements in the beef, pork and/or other meat ingredients.
2. Proteins, fats, carbohydrates, vitamins, minerals and trace elements in the milk ingredients.
3. Oils having a high proportion of monounsaturated and polyunsaturated fatty acids.
4. Proteins, fats, and high-fiber, quickly and easily and/or slowly and not readily digested and absorbed carbohydrates, proteins, fats, vitamins, minerals and trace elements of vegetable ingredients.
5. Proteins, fats, carbohydrates, vitamins, minerals and trace elements of fish or shellfish ingredients.

In diverse and general studies of diet in industrial nations, it has been found in particular that the prevalent situation includes 1. an excessive intake of energy,
2. an inadequate intake of essential nutrients, and
3. stress due to undesirable ingredients in the diet.

This development, which is thus primarily due to faulty nutrition and overeating, leads to a lowering of the quality of life and of life expectancy and causes illnesses such as obesity, atherosclerosis, cardiovascular diseases, essential hypertension, diabetes, adiposis hepatica with chronic hepatitis, cirrhosis of the liver, and the like.

In most industrial countries, coronary and/or circulatory diseases, in particular, are one of the most significant health problems. Every other person dies of such a disease, many of them prematurely. Coronary and circulatory disease are the most frequent reason for hospital admissions and they entail high costs, which in Switzerland, for example (with 6 million inhabitants), amount to approximately 15% of direct health costs, that is, not less than approximately 2 billion Swiss francs. For the Federal Republic of Germany, given its population size, this would correspond to an amount of at least 40 billion Deutsche Mark.

| Comparison of Various Ingredients and Food Energy | | | |
|---|---|---|---|
| Content per 100 g | Conventional Sausage Products | MP Products (LCLF) | Fresh Meat |
| Fat content | ca. 25-50 g | ca. 5-10 g | ca. 7-30 g |
| Mean fat content | 33 g | 7 g | 19 g |
| Protein content | ca. 10-16 g | ca. 12-18 g | ca. 17-21 g |
| Mean protein content | 12 g | 13 g | 18 g |
| Carbohydrate content | — | ca. 2-5 g | — |
| Mean carbohydrate content | — | 3 g | — |
| Energy content from fats | 297 kcal | 63 kcal | 171 kcal |
| Energy content from proteins | 48 kcal | 52 kcal | 72 kcal |
| Energy content from carbohydrates | — | 12 kcal | — |
| Mean total energy | 345 kcal | 127 kcal | 243 kcal |
| Cholesterol content | ca. 85-100 mg | ca. 30-35 mg | ca. 70-110 mg |

The nutritional-medical situation for consumers was an important impetus for the development of the MP products. It is known that diet-related illnesses have increased greatly in recent decades, especially in industrial nations, and can be considered diseases of this age and of this population. A large part of the populace in Switzerland, the Federal Republic of Germany, Austria and other countries suffers from overweight because too much food is eaten, and above all too much food having an excessive fat content.

Since the risk factors for coronary and circulatory diseases appear even in childhood, primarily because of overweight and obesity, the appropriate prophylaxis must be instituted early, and the entire family must be involved.

In the Federal Republic of Germany, approximately 53% of the death rate is ascribed to coronary and circulatory diseases.

Studies have shown that at least one-third of consumers are markedly overweight. Of these, 50% have either fatty degeneration of the liver or adiposis hepatica.

In the view of specialists in the field, about 15 million West German citizens should be encouraged to stick to a diet. The number of these citizens needing a diet, according to estimates of the Diätverband [Dietary Association], comprises 5 to 7.5 million West German citizens with high blood pressure, 2.25 million diabetics, approximately 1.4 million gout patients, approximately 3 million rheumatics, 6-12 million citizens suffering from lipometabolic disorders, and approximately 6.3 million West German citizens with liver, kidney or gall bladder disease.

If generally low-calorie foods were offered and dietary measures intensified, and is some other living habits were consequently changed, it would certainly be possible to reduce the hefty expenditures for health (approximately 210 billion DM in the Federal Republic of Germany in 1981) considerably and to use the monies thus saved more advantageously.

If one considers the fact that according to the most recent data, for the year 1981, each West German citizen consumes an average of 27.4 kg of spreadable and cooking fat (converted into pure fat)—that is, just as much as in 1980 and ten years before that (in 1957, the minimum fat consumption was calculated as 24.7 kg), then one must conclude that the research and studies of the physiology of nutrition that have been done for over 15 years, and the recommendations made by specialists in the field as a result—predominantly entailing a great number of usually quite complicated dietary proposals, which are time-consuming to carry out, as well as general rules for behavior—have evidently not brought about any important changes in behavior on the part of consumers.

From various sources in the literature, it can be learned that West Germans consume approximately 140 g of fats a day per capita. It has already been recommended by various authorities, for instance as early as 1976, that the daily fat intake be reduced to 60-90 g.

The excessive intake of nutritional energy which is responsible for this overfeeding, and which is especially excessive in the age groups between 30 and 65, is dictated predominantly by the following factors:

The preparation of fats consumed or eaten in the diet is much too high and is due primarily to the intake of inherently hidden fats, masked by the manufacturing process, especially in sausage and meat products, cheese, milk and milk products and baked goods and sweets.

A further disadvantageous intake of calories energy is caused by high alcohol consumption, especially in men.

The consumption of sugar (especially disaccharides derived from cane and beet sugar) in sweets is considered to be too high.

It is important to note that fat consumption has remained substantially constant over the past ten years, and according to various data and estimates in the literature this can be classified in terms of the various types of fat as follows:

| MEAN FAT CONSUMPTION PER YEAR PER CONSUMER (GERMANY) | |
|---|---|
| Butter | 7.1 kg |
| Salad oil | 5.5 kg |
| Margarine | 8.4 kg |
| Animal fats | 6.4 kg |
| Spreadable and cooking fats, total: | 27.4 kg |
| Attached fat or hidden fat, that is, fat masked by the manufacturing process, in sausage products, meat products, fresh meat, cheese, milk products, milk, sweets and baked goods, mayonnaise, eggs and egg products, fish and fish products and the like | 28.5 kg |
| Total fat consumption | 55.9 kg |

In these data, it should be noted that only a certain portion of the fat is in fact consumed, because of waste, spoilage, losses in food preparation, material thrown away after eating and the like. In frying, fats and oils are absorbed to only a limited extent by the material being fried. Only when the material is breaded and fried is there a relatively large absorption of fat. It should also be noted that butter, vegetable oils and fats as well as animal fats are incorporated into sweets and baked goods.

The fact that fats which are by nature hidden are masked when incorporated into products represents a special problem.

According to estimates based on available data, of the total fats consumed, approximately 64% must be hidden fat, that is fat primarily contained in sausage products, fresh meat and meat products, cheese and milk products, candies and baked goods and the like. This means that the first product grouping contains approximately 38% of the fats in absolute terms (in proportion to the total fat quantity).

Although approximately 60% of processed meat (from butchering of animal carcasses) is sold as fresh meat and the remaining approximately 40% is sold as finished products processed by the industry or by butchers, primarily in the form of sausage products, the fat contained in these two groups of products is divided into approximately equal shares; in fresh meat, this is intramuscular or attached fat (in finished packages, fat packaged along with the meat), and in the sausage products this is fat incorporated or hidden by the butcher or manufacturer. It should be emphasized in this connection that the mean fat content in sausage products is significantly higher than in fresh meat, whereas the protein or albumin content in fresh meat is over 50% higher than in sausage products (see the table on page 7).

The proportion of hidden fats in sausage and meat products must accordingly amount to almost 40% of the total fat consumed. Conventional sausage products usually contain from 25% to over 50% fat and most of them therefore have calorie contents between 250 kcal per 100 g to generally more than 500 kcal per 100 g.

It should be noted here that cooking fats and spreads are thrown away after use and are only partially consumed, because especially during frying, fats and oils are absorbed to only a limited extend by the material being fried.

Some butter, vegetable oils and fats as well as animal fats are incorporated into sweets and baked goods.

A further consideration is that especially recently, some food products that are actually calorie "bombs" have been cleverly advertised as both flavorsome and healthful. Advertising is known to exert a considerable influence on the consumer, so that a certain drifting away from health-oriented thinking toward more pleasure-oriented behavior can already be noted on the part of consumers.

These facts are also pointed out in the Nutritional Report for 1980 issued by the Deutsche Gesellschaft für Ernährung e. V. [German Society for Nutrition, a registered associated] under contract from the Federal Minister for Nutrition, Agriculture and Forestry. In this report, it is slated that in considering the urgent requirement that adults, in particular, reduce their fat intake, it should be noted that over 60% of the fat intake on the part of the consumer is due to "hidden fat", and that this fat is primarily contained in sausage products and meat, which—as already noted above—amounts to around 30% of the total fat intake.

Certainly the supply of energy from other sources also plays an important role; however, it is recommended that both the intake of food fats (fats with relatively high melting points) and the eating of foods containing high amounts of fats be restricted.

In a statement by the American Heart Association in 1982, which was intended to guard against cardiovascular diseases and especially to reduce the rate of coronary heart diseases and other arteriosclerotic diseases in our society, the following dietary recommendations are given, based on various studies: a reduced intake of saturated fatty acids, the partial replacement thereof by unsaturated fatty acids, increase in carbohydrates, a marked lowering of dietary cholesterol, and an adjustment of caloric intake such that the optimal weight is reached and maintained. The basis for these recommendations are diverse studies which demonstrate the relationship between diet and coronary heart diseases. In the opinion of the AHA, the population of the United States (and this applies to other industrial countries as well) should at least have the opportunity of choosing foods which are appropriate in the AHA-recommended diet. These foods should be available both in stores and in restaurants. This viewpoint was also confirmed after thorough, long-term research programs conducted by the National Institute of Health in Bethesda.

Perhaps it should also be noted at this point that overweight can be overcome primarily by a reduced caloric intake and a correct diet. Using up energy by physical exercise is capable of eliminating only fractions of the excessive energy supplied by excessive food intake. For instance, in order to compensate for the easily 500 kcal provided by 100 g of mettwurst [one type of German sausage] or 200 g of frankfurters, 1½ hours of swimming or intensive tennis-playing, or 2 hours of bicycling or heavy gardening would be needed.

The overall market situation in the meat and dairy industry has not developed satisfactorily. It is known that the consumption of both meat and milk has been stagnant for some time and is not longer keeping up with production, which especially in the case of milk has been increasing steadily for well-known reasons.

The causes for this include the fact that meat is expensive; that milk sales cannot significantly increase in the face of the limited acceptance of this valuable food by large segments of the population; that in recent years only a few new, flavorful products have helped increase consumption; and that there is a preferred trend toward vegetarian dietetic and health food, probably due to dietary misconceptions.

One alternative to meat consumption at present is to offer the consumer flavorfully prepared sausage-like products at a more economical price. Almost no conventional delicatessen meats, however (with the exception of poultry pies and jellied meat products), conform to the well-founded recommendations that foods lower in calories and lower in fat be eaten.

In recent years only a few products, quite mediocre in flavor, have brought about a little consumption, and probably due to dietary misconceptions there is a certain trend toward vegetarian dietetic and health food, which however remains limited to sales by drugstores and health-food stores.

The soft market for reduced-calorie products is unfortunately classified as a portion of the total market for weight-reducing products and preparations, and has given such products a certain negative image. Unfortunately, manufacturers and merchants have paid very little attention to such health food products (with a few exceptions).

Quite generally, the preparation of sausage traditionally served to make use of the excess fats (lard, bacon, tallow and the like) produced in butchering in a form that, although "processed", would be as attractive as possible to the consumer. Social, economic and nutritional/physiological conditions, however, have undergone fundamental changes in the meantime, and particularly recently. Human beings no longer do so much physical labor. Fats are no longer required in the same amount, and when consumed to excess they are harmful to human metabolism. The need has accordingly shifted from quantity to quality—that is, toward the physiological value of food fats.

The present trend toward "improved" pork, by breeding a "healthier" pig having more fat and bacon, runs contrary to what has been learned of the physiology of nutrition, because the production, sale and consumption of fatty sausage will necessarily increase.

The contrary marketing of meat and milk that has been typical thus far hardly allows for any increase in consumption. If additional novel, economical mixed products with improved physiological/nutritional characteristics, based on milk and meat and having a low fat and calorie content, are put on the market, a considerable increase in the consumption of both meat and milk can thus be effected, by increasing the acceptance of these products.

The contention, based more on market considerations, that using milk in sausage-like products is an adulteration cannot be agreed to. Milk, just like muscular substance, is a product of the entire organism of the cow. On the other hand, adding 2% denatured lactalbumin for fat stabilization is not after all considered an adulteration.

From the biochemical standpoint, lactalbumin is in any case significantly closer to myoalbumin than myoalbumin is to muscle fat. Also, milk is obviously also produced by the cow, while the fat and flesh of the pig are considerably different in overall character, and the pig itself certainly is the product of a different development.

To a limited extent, the creation of a new market for milk and meat and thus an expansion of the total market will lower the salts of pork fat (bacon). A general reduction of fat intake is a desirable goal, however, on social and economic grounds as well. The consumer himself is looking for leaner and more healthful meat. The market experience of butchers from various regions confirms this trend toward leaner, yet more flavorful pork. Young pork roast is preferred over so-called underweight, extremely low-fat, slowly grown pigs—that is, the meat from E-pigs (PSE), rather than that of so-called runts.

Figure 1:
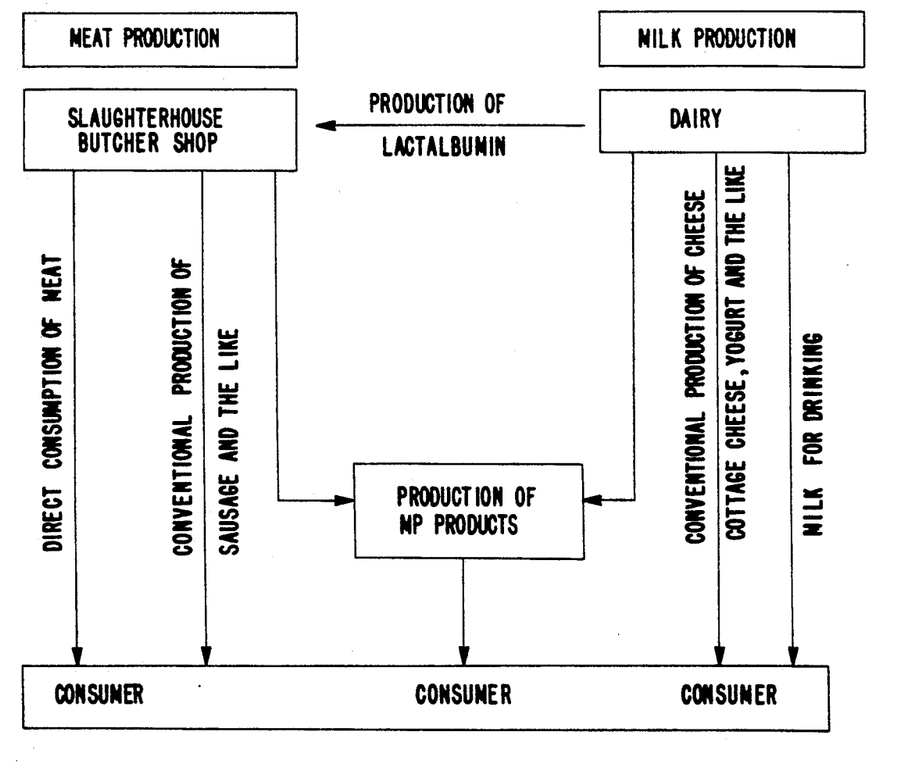
The single FIGURE is a diagram illustrating the mixing of milk and meat in the processing industry.

The following diagram shows that the mixing of the milk additives and the meat additives used is done only at the level of the processing industry. The result is a third additional market outlet. Increased salts are primarily expected in the fields of delicatessen meats as well as specialized milk products. Because the introduction of such new products is generally gradual, no substantial or overly rapid changes in the overall market will occur.

The interrelationships can be diagrammed as shown in the figure:

Previous attempts to counter the unhealthful diet of the public amounted substantially to exerting some influence, by means of health education, on the eating habits of the populace by making various dietary proposals. Yet the selection of nutritionally appropriate, yet flavorful delicatessen products available on the market is extremely narrow.

Although some dietetic products (mostly of vegetable origin) are available on the market, which are usually made by complicated processes and often involve chemical preparations, it has not been possible thus far to find on the market, products of equivalent value to the MP products, which have a particularly advantageous composition in terms of the physiology of nutrition.

What has been available has been primarily lacto-vegetable products, which offer virtually no advantages in terms of calorie reduction. A certain reduction of fat and calories was attained in some few sausage products by replacing the fat and bacon with lean meat. Such products are inherently quite expensive (approximately 20 to 30 Swiss francs per kilogram).

Because of the above-addressed dietary situation and taking into consideration various nutritional therapy concepts proposed by specialists in the field, the objective of the present invention was to provide a broad spectrum of low-calorie products with better nutritional balance, which are equivalent to conventional products at least in consistency and taste yet have substantial improvements in terms of their nutritional value.

It is an object of the present invention to provide a process for preparing food products of high value in terms of nutrition, based on milk.

In attaining this objective, the primary emphasis was and is, on the one hand, the lessening of the caloric value of the newly created products by replacing the fats, and on the other hand to address the particular and increased need for essential nutrients.

Thus far, research and development studies have been carried out with particular emphasis on milk as a raw material. Because of its particularly advantageous composition, and because it is a product of agriculture of which a surplus is likely to exist in future as well, milk is considered to be particularly suitable for direct processing.

Milk is a food with a very wide spectrum of uses, and it is an excellent "protective food" for all human age groups, in the context of preventive medicine and social hygiene.

Milk contains proteins with a complete range of biologically matched amino acids, fatty acids of various degrees of saturation, carbohydrates and a number of essential substances such as vitamins, minerals (particularly calcium) and trace substances.

Because of its balanced composition, milk, especially in its original form, is suitable not only as an ingredient in a balanced, low-calorie healthful diet for wide segments of the populace, but also as an ingredient for providing variety in dietetic food in the prevention and treatment, for example of the diseases above noted.

In using milk and milk derivatives as an ingredient in delicatessen meats, one economic aspect is particularly important:

To produce 1 kg of live pig, an average of 3.5 kg of grain or grain products is needed. Approximately 40% of the body of the pig is muscle substance, containing 220 g of protein per kg of muscle; in other words, 3.5 kg of grain produces approximately 88 g of high-grade animal protein.

In milk production, the following figures should be noted: With an average of 3.5 kg of grain, approximately 7.0 kg of milk, containing 245 g of high-grade animal protein, is produced. The yield is at a ratio of approximately 3:1 in favor of milk.

These data, too, clearly argue for using milk to an increased extent in delicatessen meats, as well as in creating special low-calorie products in an attempt to solve the problem of calorie reduction by offering an appropriate selection on the market.

Although many kinds of studies have made the most varied proposals for using milk, powdered milk, whey, or other, usually chemically processed, milk derivatives as binders, protein ingredients or the like, primarily in relatively small quantities, it has nevertheless not been proposed, nor is it obvious, that original milk or milk emulsions should be used as an essential or primary ingredient in sausages, pastries, or other foods, because in terms of consistency, appearance and taste, especially in the case of sausage and pastry products, such usage goes against the conventional notions of persons working in this field.

The following basic information was gained from previously developed technologies and products: Certain biochemical and technological considerations and studies yielded the basic knowledge that a specialized process technology can be worked out which not only in principle enables the processing of milk and meat, as well as other ingredients of various origins and various modifications, together, but also enables the manufacture of a wide spectrum of novel "milk-and-meat products" as well as reduced-fat, reduced-calorie milk products.

The specialized and modifiable MP technology makes it possible, as needed, to produce the most various MP products, containing meat and milk as their primary ingredients, yet having a predominantly sausage-like or pastry-like character when conventional proportions of meat are used.

Since conventional delicatessen meat products, because of how they are made, usually have fat contents of from 25% to far more than 50% and energy contents of from 250 kcal to over 500 kcal per 100 g, the technological product development is intended to attain an over 50% reduction in calories and fat content, an improvement in the content of essential nutrients, good consistency, good taste, and good keeping qualities.

Basically, this objective is attained in that MP products comparable to conventional delicatessen meat products can be produced which have fat contents between 5 and 10% and caloric values between 90 and 140 kcal, which substantially reduces the otherwise typical caloric values. This is effected even though specialists in the field believe that a calorie reduction of up to 40% cannot be achieved without changing the sensory quality so much, because of the lack of fat and bacon, that the consumer will reject it. The contention that conventional sausage products having less than 15% fat taste "flat" has been disproved.

In accordance with the invention original milk (whole milk or nonfat milk) or milk derivatives (e.g., powdered whole or nonfat milk) is used in amounts of up to 90 parts of the two main ingredients, milk and meat. Special ingredients, such as binders and the like, are not required in the MP process.

In the MP products, the milk and meat ingredients complement one another in terms of amino acids and fatty acids (especially essential amino acids and fatty acids), vitamins, minerals and trace elements.

Since the composition of the MP products can actually be "programmed", it is also possible, for instance to incorporate lipid components with additional essential saturated and unsaturated fatty acids. Aside from the advertising competition between the vegetable-fat (soy) and animal-fat (milk-fat) markets, it is largely a physiological fact that of the vegetable fats, only wheat germ oil and sunflower oil, because they contain large amounts of vitamin E (anti-oxidative action, saving oxygen for the myocardium), have dietetic or nutritional advantages.

Conventional delicatessen products are basically mixed fat/meat products, in which there is virtually always a significantly higher fat content than protein (albumin) content. In MP health food products, contrarily, the protein content is significantly higher than the fat content, and the products nevertheless have good flavor.

The contention generally put forth by those in the field, that the water-binding capacity and fat emulsification in meat processing or sausage production, in a complex colloidal system such as that of Brühwurst [a type of German sausage] filling, depends on the ratio of fat, water and albumin in the filling, and that little or no fat (less than 25%) produces fillings with a great deal of jelly and disadvantages in terms of taste and smell, has proved to be irrelevant in the products produced by the MP process.

It has also been possible to determine that the addition of special binders and fat emulsifiers, such as disintegrated casein, is unnecessary, because in the MP process natural, inherent binding capabilities of the animal products, meat and milk, are initiated and exploited.

The MP products are to a certain extend comparable with lean beef and lean pork, because they have similar protein, fat and water contents. Because all the valuable components of the whole milk are included, an improved nutritional value as compared with lean meats and a high biological value are attained, despite the low caloric content.

Special product tests have also shown that with the aid of modified MP processes, products especially suitable for developing countries can be created, which have a high but also balanced nutritional value that is adapted to conditions of a given region. These economically manufacturable MP products are particularly useful because the processing makes it possible to exclude certain nutritional incompatibilities. For instance, a standard canned MP product can be eaten cold, fried, grilled or boiled, and with a suitable composition it can provide the consumer with a wide spectrum of essential nutrients.

SUMMARY OF THE INVENTION

It is an object to provide a food product and a process of its preparation while lessening of the caloric value of the newly created products by replacing the fats, and on the other hand to address the particular and increased need for essential nutrients.

Briefly, the invention therefore provides a process for producing food preparations having adjusted energy and nutritional values, comprising milk, milk products and meat products, fruit products, grain products and other foods, which is characterized in that the food preparation, its energy and nutritional value having been adjusted by way of the ingredients used, is produced without the use of chemically processed or produced starting ingredients or additives, from a) a frozen or deep-frozen basic emulsion/basic mixture, as an ingredient, based on milk or a milk emulsion comprising a milk component, optionally a lipid component, and other nutrients of any kind, and b) one or more well chilled and/or frozen identifying ingredients i.e., meat, fish, fruit, grain, etc., which are incorporated in a cutter into this basic emulsion and the resultant food preparation is further processed in a conventional manner to make fresh products, products with a limited keeping quality, canned goods, deep-frozen products, dried products and the like.

A preferred embodiment of the process according to the invention is characterized in that from 98% to 2%, preferably from 98% to 51% of the milk or basic emulsifion, which is chilled or frozen in a temperature range suitable in accordance with the composition and properties of the ingredients, is mixed with from 2% to 98%, preferably 2% to 49%, of the identifying ingredient, which is chilled or frozen in a temperature range suitable in accordance with the composition and properties of the ingredients wherein the ingredient is a meat, meat product, meat derivative, fish and/or crustacean component, milk, milk product, milk derivative, grain product, vegetable product, fruit product, and/or other nutrients and flavorings.

A further preferred embodiment of the process according to the invention is characterized in that the basic milk emulsion comprises a milk component and optionally a lipid component such as a fat and/or oil component, wherein the milk component comprises whole milk and/or partially skimmed or low-fat milk and/or nonfat milk and/or buttermilk and/or whey and/or powdered whole milk and/or powdered whole milk solution and/or powdered nonfat milk and/or powdered nonfat milk solution and/or powdered whey and/or powdered whey solution and/or mixtures of these components, and the lipid component comprises an animal fat and/or oil such as butter or cod-liver oil and/or vegetable fat and/or oil such as sunflower oil, wheat germ oil, olive oil and/or other lipids and/or mixtures thereof and/or natural-based fat and/or oil substitutes.

Another preferred embodiment of the process according to the invention is characterized in that in the thoroughly homogenized basic emulsion, comprising milk and/or a milk emulsion (milk component and/or fat component), the components in the milk emulsion are preferably processed in a mixture ration of from 99–50% parts of the milk component to 1–50% parts of the fat component, the mixture ration of the animal fat and/or oil component to the vegetable fat and/or oil component amounting to approximately 1:99 to 99:1.

A further preferred embodiment of the process according to the invention is characterized in that the milk preparation comprises from 98%–2% unfrozen or frozen milk product component, as the basic mixture, and the other ingredient comprises from 2%–98% unfrozen or frozen, chemically unprocessed, optionally fresh nutrient component including salts and seasonings, wherein as the nutrient, meat, milk, fish, crustacean, grain, vegetable, fruit or other nutrient products are processed in the processor or other suitable apparatus in superfinely comminuted or texturized form and chilled or frozen and mixed and/or combined with the well chilled and/or frozen milk product component, which is produced from nonfat milk and/or partially skimmed milk and/or whole milk and/or powdered nonfat milk (solutions) and/or powdered whole milk (solutions) and/or yogurt and/or other milk products or milk fractions, and wherein if desired, in a suitable method step, vitamins, minerals, trace elements, essential compounds and/or active ingredients and/or roughage are incorporated into the basic emulsion and/or the identifying ingredient.

A further preferred embodiment of the process according to the invention is characterized in that the frozen milk or milk emulsion of the basic emulsion is mixed with the chilled or frozen meat component or other mixture components of the identifying ingredient in the form of cubes of meat or mixture of various sizes or a coarse- or fine-grained meat or mixture granulate in the cutter or some similar apparatus effecting thorough mixing or homogenizing or dispersal, wherein optionally up to 20% of the frozen meat or mixture component can be replaced by freshly-slaughtered meat and the composition thus produced is apportioned out, smoked and/or cooked through and/or sterilized or spray- and freeze-dried or spray- or roller-dried.

A further preferred embodiment of the process according to the invention is characterized in that the milk or the milk emulsion or the milk product mixture of the basic emulsion is mixed with starter cultures or lactic acid bacteria and/or subjected to slight acidification by means of a flavoring acid additive such as citric acid.

A further preferred embodiment of the process according to the invention is characterized in that the basic emulsion and the second component or identifying ingredient is processed at temperatures of from $+40°$ and $-40°$ C., preferably at temperatures of from $+10°$ to $-20°$ C., and particularly preferably at temperatures of from $+8°$ to $0°$ C. The food products of the invention have improved keeping qualities, having adjusted energy and nutrient values are as natural as possible, are characterized in that they are composed of from 2-50% proteins, comprising meat, milk, fish or other proteins; from 2-25% lipids; from 2-25% carbohydrates, comprising lactic, vegetable or other carbohydrates; and optionally the remainder being water.

The invention relates provides low-calorie, low-fat food products, comprising from 3-18% proteins, 2-9% fats (lipids), and 2-9% carbohydrates, the remainder being water.

The invention more particularly provides low-calorie, low-fat, low cholesterol food products having a calorie content below 100 kcal and a fat content of approximately 3.5% fat, [and] a cholesterol content of approximately 30 to 35 mg per 100 g of product, produced in a processor from 60 parts of frozen, low-fat milk and/or whole milk ingredient (<0.5 to 3.5% fat) as a basic emulsion and approximately 40 parts of one or more frozen identifying ingredients comprising approximately 80% very lean (preferably freshly slaughtered) beef or game meat (approximately 2 to 4% fat) and approximately 20% low-fat milk (approximately 0.5 to 1.5% fat).

The invention also pertains to the use of a milk ingredient, produced from preferably homogenized milk or from a milk emulsion comprising milk, powdered milk, fats and other nutrients and optionally in mixed form including other nutrients, in the production of milk products, sausage products, fish products, pastries of all kinds or other foods with improved keeping qualities as a substitute for the otherwise customary and conventional use of mixtures of bacon/fat, bacon/fat/water or mixtures of bacon/fat/water and denatured lactalbumin (or caseinate) and other emulsifiers, binders, thickeners and the like.

The invention likewise provides for an ingredient in a frozen or well chilled state and preferably in a fine-grained and/or coarse-grained comminuted form and/or in the form of frozen texturized particles for the production of food preparations having adjusted energy and nutritional value and comprising milk, meat, fish, seafood, vegetable, fruit or other nutrient ingredients, in an amount of 50 parts or more of the total product.

The invention further is directed to the use of the cutter or a vacuum cutter or a cutter processor (vacuum cutter) having a refrigerating and freezing apparatus or some other suitable apparatus effecting pronounced emulsification and/or homogenization as the primary cutter apparatus for producing food preparation products in accordance with the invention.

The food preparations produced by the novel MP process exhibit outstanding properties and can essentially be defined as pastry-like products having excellent properties in terms of the physiology of nutrition.

The MP products can be produced as sliceable firm or spreadable products, which can be served both cold and heated, that is, boiled, fried and the like.

The desired content of albumin substances, fats, carbohydrates, water, vitamins, mineral and trace substances can readily be adjusted without particular difficulty, or in other words programmed, as it were. Thus roughage, for instance, as well as fats having a specialized content of unsaturated fatty acids and other essential ingredients can easily be incorporated.

One standard product group (for instance breakfast meats, Gelbwurst (soft sausage), mortadella, Fleischwurst (meat sausage), Schinkenwurst (ham sausage), liverwurst, Römerpastete [at type of pate], wieners and the like) has a composition, for example, of approximately $11\%\pm3\%$ albumins, approximately $7\%\pm2\%$ fats, and approximately $3\%\pm1\%$ carbohydrates, as well as a caloric value of approximately $120 \text{ kcal}\pm15\%$.

The specific properties of the novel MP process for processing milk and meat and the products produced with it offer many advantages in the most varied segments of the health field and the market economy.

A summary of advantageous characteristics of the MP products will now be given.

Advantages in Terms of the Physiology of Nutrition

A high degree of naturalness due to non-damaging technology in producing the MP products A high, balanced potential of essential nutrients based on a varied composition of proteins, fats, carbohydrates, vitamins, minerals and trace substances in the two primary components, meat and milk Good flavor without the admixture of pork fat, beef tallow or the like Good consistency without using binders or high proportions of fat Good keeping qualities and partially improved keeping qualities without special additives such as preservatives and the like Low in calories and fat Markedly reduced salt and sodium content Generous supply of iron and calcium Characteristics of a basic diet product Favorable composition for regulating basic metabolic and circulatory functions and thereby particularly well suited as dietetic food for long-term dietary therapies Usage as standardized and economical food for the sick Usage as general diet food for kindergartens, homes for the aged, sanatoriums and the like Diversified applicability for feeding military personnel and for government food stockpiles and the like Making milk more valuable as a food for the general public and increasing its acceptability Substantial increases in usability and digestibility of milk in developing countries in the form of a more-valuable yet less-expensive milk/meat product

Economic and Commercial Advantages

Substantial savings in subsidies and reduction of stored surplus due to increased consumption of milk products Less processing of milk into powdered milk, thereby saving energy costs, storage costs and the like Nonfat milk can be processed with meat and especially surplus beef to make a highly valuable mixed product Additional security for farmers' livelihoods because of increased consumption of milk and milk products Intelligent economical use of milk to produce foods instead of animal feed Inexpensive product because the starting materials are already available in quantity and because the technology is simple Impetus for new enterprises (individual butchers or industrial produces) on every order of magnitude, because of additional opportunities for earnings Large-volume consumption, with public institutions, hospitals, kindergartens, schools, factory and military canteens and the like being merely the beginning If a certain amount of purchases by public institutions and consumers are guaranteed, additional profits to the producers are assured, making it possible to assure and create manning programs and jobs Favorably priced export product, for instance for developing countries Additional sales opportunities for manufacturers of appropriate machinery and apparatus Considerable medium- and long-term savings possible in the health field from the usage of MP products as health foods and diet foods

Advantages in Terms of Process Technology

Relatively simple manufacturing technology

Conventional machinery can continue to be used

No particular demands made on manufacturing personnel

Milk and milk derivatives as starting products, as well as the other ingredients, are available in sufficient quantity, for the most part even to excess Canned MP products are simple to manufacture The basic MP mixture can be converted to dried form using conventional methods The following target groups can be listed as manufacturing and/or salts organizations:

1. The grocery sales field including shopping centers, supermarket chains, consumer cooperatives, self-service stores, department stores, discount stores, delicatessens and the like
2. Butchers and meat markets of all types
3. Food service businesses such as restaurants, fast food operations, hotels, snack bars, recreational clubs and the like
4. Canteens in industrial, commercial and small-business enterprises
5. Hospitals, homes for the aged, children's homes, nursing homes, sanatoriums and the like
6. Food service in schools and universities
7. Food service for military and police forces as well as prisons and the like
8. Canteens in government agencies
9. Pharmacies, drugstores and health-food stores
10. Food aid and development programs
11. Light meals for public carriers such as airlines, railroads and the like
12. High-energy food ("power food") for athletes and others at high performance levels The following marketing areas are appropriate for the MP or meat-and-milk products produced by the MP process:

1. Low-calorie MP products as health food for general consumption
2. Low-calorie and/or low-fat and/or low cholesterol MP products as health food with data provided on caloric and nutritional values
3. Dietetic, low-calorie and nutritionally adjustable MP products, primarily for sale in hospitals, pharmacies and health-food stores (dietetic food)
4. MP products as delicatessen and specialty products
5. MP products in ready-to-serve form (in cans, deep-frozen and/or in dried form)
6. Special novel MP fish products, MP milk products or foods of such kind, of mixed composition and with adjusted energy and nutritional values
7. Specialized high-energy MP products (for athletes, children, as development aid) ("power food")
8. MP feeds (cattle feed, fish food, pet food)

The milk preparations that can be produced using the MP technology can be both sliceable and spreadable. They can be eaten cold and are suitable for preparation by frying, grilling, baking, boiling, steaming and the like.

Milk preparations are produced in liquid, viscous, pastry or solid form. Example of such MP products are milk pastes, yogurt products with and without fillings, cheese-and cottage-cheese-like products, ice cream products, spreads for bread, puddings, custards, desserts, butter and margarine products with fat content reduced to half or one-quarter, reduced-fat butter/margarine/oil mixture products, milk/fruit slices, vegetable/milk steaks, pie and cake fillings, milk-based food for children, MP milk preparations as substitutes for usual conventional fat/bacon/emulsifiers/water emulsions and fillers for sweets and baked goods.

The MP products with meat fillings that can be produced by the MP process can be classified according to the conventional type of sausage:

1. Fine Brühwurst (cooking sausage), Fleischwurst (meat sausage), Gelbwurst (soft sausage of the bologna type), Lyon sausage, bologna, Weisswurst (white sausage), Rosties (grilling sausages)

2. Coarse Brühwurst (cooking sausage), Bierwurst (beer sausage), Jagdwurst (hard sausage), Lyoner Schinkenwurst (ham and Canadian bacon), Bauernfrühstück (spicy sausage), Heidefrühstück (herb sausage), Römoerwurst (spiced herb sausage), Römerpastete (spiced her sausage)

3. Brühwurst in the form of partially smoked products (smoked Lyon sausage, Tyrol sausage, Krakau sausage, cooked salami)

4. Brühwurst with inlays of coarse pieces of meat (Bierschinken (spiced ham), mortadella, Schinkenwurst (Canadian ham sausage)

5. Large and small sausages (Knackwurst, frankfurters, wieners, sausages of every type)

6. Liver pates and similar products (calves'-liver pate, ham pate, liver loaf, game pies, liver pates, liver cream, chicken-liver pate, fish pate, crustacean pate, seafood pate, etc.)

7. Cooked sausage (fine liverwurst, coarse liverwurst, herbed liverwurst, Braunschweiger liverwurst)

8. Meat paste products (Fleischkäse, white Fleischkäse—optionally with fillings such as mushrooms, etc.—, Leberkäs, breakfast meats, lunch meat)

9. Mettwurst—and salami-like products

With the aid of the MP technology, the greatest possible variety of fish and seafood products can be made, and fresh fish and cooked, baked and smoked ocean and fresh-water fish can be used. Thus the most diverse kinds of fish pates and pies, fish sausages, shrimp, prawn, crab and lobster products can be produced. By using the MP technology, crustacean products with substantially reduced cholesterol can be produced, which are very similar in texture and consistency to the products as found in nature. By incorporating deep-frozen protein and raw materials containing carbohydrates, textured and/or fiber-containing products can be produced, in this field as in all the MP products.

In order to vary the consistency, texture, appearance and taste depending on the product to be made, different particle sizes, various processor speeds and especially certain temperature ranges, preferably low temperatures, are used, with the ingredients in the well-chilled or frozen state.

The milk preparations produced by the MP process are particularly applicable to dietetic uses. In terms of dietetics, the MP products (except for the high-energy products intended for developing countries) can be considered to be low-carlore and low-fat, vitamin- and mineral-enriched, with reduced sodium and improved nutritional value.

The basic diet modifications of the MP products can basically be used as general health food products, which can advantageously be used for overweight and especially obesity, that is, with body weights above normal as a consequence of increased proportions of body fat.

From the Dietary Report for 1980, it can be seen that every third citizen of the Federal Republic of Germany is overweight. The main cause of overweight and obesity is that eating habits have been adapted not at all, or only belatedly or incompletely, to the lower energy requirement typical of altered present-day living conditions. Overweight and obesity can promote the following diseases, or can have a negative effect on their course:

heart and vascular diseases
metabolic disorders
diabetes mellitus
wearing of the joints and spinal column With the aid of the MP products, the energy supplied can be reduced within the context of the medium- or long-range diet therapy, with the supply of essential nutrients being improved substantially. Specific dietary modifications of the MP products have been developed for the following basic dietary modifications and can be adapted by means of the MP technology:

1. Basic dietary modification for overweight, obesity and adiposis hepatica in adults (low-calorie basic-diet variant/generalized reducing diet)

2. Basic dietary modification for overweight and obesity in children and young people (low-calorie, modified basic-diet variant)

3. Basic dietary modification for hypertension (low-sodium, low-calorie basic-diet variant)

4. Basic dietary modification for atherosclerosis in the elderly (risk of heart attack, coronary sclerosis, rehabilitation after heart attack, cerebral sclerosis and peripheral atherosclerotic vascular diseases) (low-calorie modified basic-diet variant/geriatric diet)

5. Basic dietary modification in manifest diabetes (defined amounts of carbohydrates, low-calorie basic-diet variant)

6. Basic dietary modification in the pressure of high cholesterol level, high beta-lipoprotein level (modified-fat, low-calorie basic-diet variant)

7. Basic dietary modification in primary hyperuricemia and gout

8. Basic diet modification in constipation due to lack of roughage (roughage-enriched, low-calorie basic-diet variant)

MP product variants which are adapted to special dietary requirements and also optimally adjusted in terms of nutritional value are particularly useful in cases of undernourishment, disruptions in food intake, vitamin and mineral deficiencies, convalescence, as geriatric food and food for children, and for high-performance athletics.

In this connection it should be noted particularly that according to studies made thus far, certain intolerances of milk and milk products can be considerable reduced or even completely eliminated because the milk and milk products are processed together with meat.

The novel MP technology can be applied to the following purposes and programs:

Since the MP products are suitable for consumption by wide segments of the population and can particularly be sold for away-from-home food service such as in canteens in government agencies, government institutions, and for the military forces of the Federal Republic of Germany, the MP technology could possibly be put to advantageous use for producing the most varied and commercially competitive products, on the basis of general programs for assuring and creating jobs in milk and meat processing plants.

In smaller meat and sausage producing plants, one worker produces about 0.3 metric tons per week, and in industrial-standard plants and about 0.8 metric tons per week. Taking into account the structure of the meat-processing industry, if one assumes about 0.4 metric tons per week per worker, then about 500 additional 500 workers would be needed to produce about 10,000 metric tons of MP products annually, and about 1200 additional workers would be needed to produce about 25,000 metric tons of MP products annually.

Since the MP products are particularly well suited as a basic diet for long-term dietary therapy, for instance in the case of overweight, in atherosclerotic vascular diseases and various attendant conditions, special governmental action in terms of public health policy would be recommended.

This kind of linkage of the entire spectrum of MP products with a public health program, and optionally an employment policy program, would not only make it possible to have products which are extremely advantageous in nutritional physiological terms as well as economical, but would also contribute to a certain reduction in the expense of patient care and bring about an increase in sales for middle-size enterprises; furthermore, it would eventually produce additional tax revenues and might have an effect on regional employment.

The novel MP technology can advantageously be applied in developing and upgrading agricultural production; the raw materials of milk, meat and vegetable products can be produced and further processed directly into food products (and optionally into animal feed as well).

This kind of combined agricultural production and upgrading can be economically realized together with technology transfer in the context of development aid. For instance, interesting opportunities for cooperation in the ACP/Common Market sphere arise.

Such programs and the resultant desirable export of machinery, apparatus, livestock and the like (the feedback from development aid) would have an indirect effect on employment brought about by development aid.

In the technological production of MP products, which are based on the use of milk and milk products as their main ingredient, the following possible variants in terms of the ingredients can be used:

A) General Milk Preparations

The abbreviations and terms as used herein are explained below.

1) NFM (or/and WM)+Bu/oil
2) NFM (or/and WM)+Bu/oil+E
3) NFM (or/and WM)+WMP+Bu/oil (+E)
4) NFM (or/and WM)+NFMP+Bu/oil (+E)
5) NFMP solution (or/and WMP solution)+Bu/oil (+E)
6) $A_1$-$A_5$+cheese
7) $A_1$-$A_5$+cottage cheese
8) $A_1$-$A_5$+yogurt
9) $A_1$-$A_5$+buttermilk
10) $A_1$-$A_5$+whey
11) $A_1$-$A_5$+honey
12) $A_1$-$A_5$+cocoa
13) $A_1$-$A_5$+coffee
14) $A_1$-$A_5$+marzipan
14) $A_1$-$A_5$+fruit fillings
15) $A_1$-$A_5$+vegetable fillings
16) $A_1$-$A_5$+cereal fillings
17) $A_1$-$A_5$+nut fillings B) Milk Preparations with Meat Added 19) NFM+meat 20) NFM+NFMP+meat
21) NFM+WMP+meat
22) WM+meat
23) WM+NFMP+meat
24) WM+WMP+meat
25) NFMP solution+meat
26) WMP solution+meat
27) NFMP solution+WMP solution+meat
28) NFM+Bu+meat
29) WM+Bu+meat
30) NFMP solution+Bu+meat
31) WMP solution+Bu+meat
32) NFMP solution+WMP solution+Bu+meat
33) NFM+NFMP+Bu+meat
34) NFM+WMP+Bu+meat
35) WM+NFMP+Bu+meat
36) WM+WMP+Bu+meat
37) NFM+E+meat
38) NFM+WMP+E+meat
39) NFM+NFMP+E+meat
40) WM+E+meat
41) WM+NFMP+E+meat
42) WM+WMP+E+meat
43) NFMP solution+E+meat
44) WMP solution+E+meat
45) NFMP solution+WMP solution+E+meat
46) NFM++Bu+E+meat
47) NFMP solution+Bu+E+meat
48) NFM+NFMP+Bu+E+meat
49) Fmeat+NFM+E+meat
50) Fmeat+NFMP solution+Bu+oil+meat C) Milk Preparations with Other Added Ingredients 51) $A_1$-$A_{18}$ with fish of every kind
52) $A = A_1$-$A_{18}$ with crustaceans
53) $A_1$-$A_{18}$ with seafood of all kinds
54) $B_{19}$-$B_{50}$ with special meat ingredients (game, poultry, eggs and the like)
55) $B_{19}$-$B_{50}$ with mushrooms and vegetables
56) $B_{19}$-$B_{50}$ with added fish
57) $B_{19}$-$B_{50}$ with cheese and milk-product fillings
58) $B_{19}$-$B_{50}$ with soy or soy products
59) $B_{19}$-$B_{50}$ with potato fillings
60) $B_{19}$-$B_{50}$ with crustaceans
61) $B_{19}$-$B_{50}$ with seafood of all kinds List of Terms and Abbreviations NFM = nonfat milk (<0.5% fat up to 1.5% fat)
WM = whole milk (1.5% fat to over 3.5% fat)
NFMP = powdered nonfat milk
WMP = powdered whole milk
Bu = butter or animal fats or oil of all kinds
Oil = vegetable and/or animal oils of all kinds
E = emulsion (comprising water, optionally denatured albumin, powdered milk and butter and/or oil—defined as above under "butter" and "oil"—in suitable and required compositions
Meat = beef, veal, pork and meat of all kinds and meat mixtures, partial products of these meat types, meat extracts, skins, emulsions of skins, bouillon, various collagen materials such as gelatin, and the like
Fmeat = frozen meat and frozen meat products of all kinds The means for attaining the above-stated object and the essential technical characteristics are defined by the characterizing portion of claim 1. Preferred embodiments of the invention are defined by the characteristics of ensuing claims.

In the following examples, preferred embodiments of the process and products according to the invention are explained in detail, as are the particular uses, applications and novel usages and apparatuses.

EXAMPLE 1

Milk Preparation of the Fleischkäs (meat paste) type 7.5 kg of nonfat milk (or whole milk) or a mixture of nonfat and whole milk (optionally with the addition of whey) or 5 kg of drinking water and 2.5 kg of powdered nonfat milk or 7.5 kg of nonfat milk (or whole milk) which has been mixed with 100 to 2,000 g of powdered nonfat milk (or powdered whole milk) are mixed together at temperatures of approximately 10° to 70° C. in a cutter or some other mixing apparatus that performs thorough homogenization.

After a homogeneous mixture has been produced, 300 g of butter or 300 g of oil or 600 g of a mixture of butter and oil are added in arbitrary mixing ratios in the processor. This composition is mixed at temperature between approximately 20° and 40° C. until such time as a homogeneous emulsion has been produced. This is the base emulsion.

Other proportions of the following components, nonfat milk, partially skimmed or de-fatted milk, whole milk, powdered nonfat milk, powdered whole milk sunflower oil, butter, cod-liver oil or other vegetable and animal oils and fats or fat-substitute substances derived from natural substances, roughage, and drinking water, to one another can be arbitrarily selected.

It is also possible to use only a thoroughly homogenized milk or milk emulsion for the base emulsion.

The base emulsion thus prepared is chilled to temperatures below approximately −4° C. to about −15° C., until the composition is thoroughly frozen.

The thus frozen base emulsion is comminuted in the cutter into relatively coarse or fine particles, depending on how it is to be processed further. It is also, optionally, possible to add to this mixture of ice and emulsion a very well chilled diluting emulsion in the event that, upon further processing, a relatively pastier product is desired. For a meat paste product, the identifying ingredient is meat.

A basic meat mixture is mixed in the cutter with the frozen emulsion mixture, the meat mixture for instance having been made from a) 12 kg of finely comminuted beef, 3 kg of nonfat or whole milk ice and 400 g of nitrite pickling salt or b) 9 kg of finely comminuted beef, 3 kg of nonfat milk ice (or whole milk ice or a mixture of the two) and 400 g of nitrite pickling salt (NPS).

As the cutter, a cutter of the type usually used to make meat and wurst products is used. If vacuum cutters and freezing cutters are used, correspondingly modified products are attained. Depending on the type of knives or blades used and the operating speed of the cutter, the consistency of the MP product and its overall characteristics can be adjusted. The use of a vacuum cutter has proved to be particularly advantageous.

An essential factor is that in each phase of the production process, the individual mixtures or compositions be thoroughly homogenized, until the required cohesion and consistency are attained.

To the composition produced as described above, seasonings and other ingredients such as herbs, or in the case of Römerwurst or Römerpastete coarse pieces of meat, for instance pickled pork or ham, are than added in the usual manner.

The complete composition is then packed into casings, cans or other containers in the usual manner and cooked (and optionally smoked) at temperatures of approximately 75° C. or at temperatures of 110° C. to about 114° C., depending on the manufacturing process and the ingredients, to make preserved products.

Instead of the nitrite pickling salt, normal table salt can also be used, or mixture, for instance of ⅓nitrite pickling salt and ⅔potassium salt or dietetic salt. Light-colored meat pastes or meat sausages can be made without the addition of NPS or nitrite or potassium nitrate.

If ready-mixed seasonings are used, it is advantageous to use about 3 g per kg of the complete composition. Optionally, 1 g of glutamate can also be added per kg of product, and in the case of red-colors paste, 1 g of ascorbic acid can also be added per kg of MP product.

EXAMPLE 2

Production of MP Products for Grilling and Baking 4 kg nonfat milk and 1.666 g of powdered nonfat milk are finely homogenized in the cutter at a temperature of 20° C. After the addition of from 50 to 300 g of butter and/or sunflower oil or a similar oil, this emulsion is homogenized in the processor to produce an emulsion cooled to a temperature of less than −4° C.

The viscous, very well chilled emulsion thus produced, that is, an emulsion of the slushy-frozen type, is mixed with a basic meat mixture.

This basic meat mixture is prepared from 10 kg of beef, 6 kg of frozen nonfat milk (or frozen whole milk or some other milk emulsion) and 300 g of table salt.

The complete composition thus produced is homogenized in the processor at a temperature of 0°−14° C. Seasonings are added to this complete homogenized composition, specifically 3 g of seasonings per kg of composition, 1 g of glutamate per kg of composition and, depending on the type of wurst being made, 1 g of marjoram per kg.

EXAMPLE 3

MP Products of the Breakfast Meat Spread Type (with a high proportion of meat)

10 kg of whole milk (or nonfat milk or whole milk and/or nonfat milk mixtures) is frozen into milk ice and then finely comminuted in the cutter and mixed thoroughly with 25 kg of chilled lean beef and 25 kg of chilled lean pork.

Further processing is done in the usual manner.

Instead of the 10 kg of milk ice, 10 kg of frozen emulsion or 10 kg of frozen drinking water or a mixture of 5 kg of milk ice and 5 kg of frozen milk ice can be used. An emulsion of this kind is made for instance from 5 kg of milk or milk/drinking water mixtures as well as 2.5 kg of powdered nonfat milk or powdered whole milk and 0.5 kg of sunflower oil or butter and cod-liver oil. Instead of the milk, whey or some other suitable milk product, milk product filtrates or concentrates can also be used.

The pork can be partially replaced with mushrooms, vegetables, or cereals.

Prior to filling into containers, from 10 to 35 kg of coarse, optionally smoked pork can also be incorporated into this mixture, and cevapcici [Yugoslavian sausage] seasoning and, optionally, marjoram (as well as glutamate and ascorbic acid) can be added.

EXAMPLE 4

MP Products of the Mixed-Milk-Product Type 10 of milk ice or 10 kg of milk emulsion ice, which is produced as in Example 3 and is mixed with 10 to 50 kg of coarse or fine vegetable filling of the most various types, or fruit filling, in a suitable manner. Asparagus, spinach, broccoli, Brussels sprouts, plums, apples, cherries, melons, pineapple and the like can be used for this.

EXAMPLE 5

MP Products of the Fish Paste or Crustacean Product Type

First, a milk emulsion is prepared, which comprises 5 parts of nonfat milk, 2.5 parts of powdered nonfat milk and 0.5 parts of sunflower oil (or butter).

The emulsification is advantageously carried out in a cutter.

The emulsion is then frozen. The frozen emulsion is then comminuted in the cutter. 3 kg of the emulsion is mixed thoroughly with 5 kg of a very well-chilled or frozen fish product. This seafood product may be raw, cooked or smoked fish, fish filet, shrimps, prawns, crab and lobster products (extracts). The MP paste thus prepared can be mixed with appropriate herb and seasonings in the usual manner.

A very well-chilled or frozen basic meat mixture, which is prepared in the processor from 10 kg of lean beef (or pork), 300 g 300 NPS [sic] and 3 kg of frozen nonfat milk, can be added to the above pasty composition made from emulsion and fish product.

This product is further processed in the usual manner to make the MP product. Instead of the emulsion (water/oil emulsion), simple milk ice of any type, or drinking water ice, can be used.

EXAMPLE 6

MP Product of Fish Sausage Type 4 kg of whole milk is frozen, comminuted and mixed thoroughly in the cutter with 10 of ocean-fish filet together with table salt and seasonings.

The ocean-fish filet is best if it is held in water for 24 hours before use.

Optionally, from 2 to 4 kg of frozen emulsion can be added to this fish/meat mixture, the emulsion being prepared from 5.0 kg of whey, 2.5 kg of powdered nonfat milk and 0.500 kg of sunflower oil (or butter).

EXAMPLE 7

MP Product of Römerpastete (Römerwurst) Type 4 kg of an emulsion, prepared from 5 parts nonfat milk, 2.5 parts powdered nonfat milk and 0.5 parts sunflower oil and frozen, is thoroughly mixed in the cutter with a meat/milk mixture, which comprises 10 kg lean beef, 6 kg frozen nonfat milk and 400 g of nitrite pickling salt.

The thoroughly mixed composition is then mixed in the processor with 4 kg of chilled pork.

The composition thus produced is processed further in the usual manner.

Instead of the emulsion, milk ice can be used. The consistency of the end product can also be varied by using added powdered nonfat milk or by varying the type and amount of the lipid ingredient.

EXAMPLE 8

MP Products of Liver Pate, Liver Loaf or Game Liver Paste Type 11 g of nonfat milk were thoroughly mixed with 2.5 kg of powdered nonfat milk, 1.0 kg of disintegrated casein and 1.5 butter or sunflower oil or emulsions thereof and frozen.

The casein is added only in instances where particular consistencies are desired.

1 kg of the above emulsion is comminuted extremely finely, together with 2 kg of frozen liver, in the cutter with 60 g of sodium chloride or 60 g of nitrite pickling salt being added.

A meat mixture is incorporated into this composition, the meat mixture comprising 5 kg beef or game meat, 4 kg of whole milk and 160 g of nitrite pickling salt.

The entire composition was mixed further and homogenized up to a maximum temperature of 14° C.

The seasoning comprises 33 g of special seasoning, 32 g of glutamate, 32 g of ascorbic acid, 30 g of onion seasoning. Filling into containers and cooking is performed at 75° C. and 115° C. respectively, and the product is poured into terrines with a gelating topping, or into pastry dough or cans or jars and then sterilized.

EXAMPLE 9

MP Product of Meat Paste Type

The emulsion can for instance comprise a homogeneous, frozen mixture of 2.5 kg nonfat milk, 2.3 kg powdered nonfat milk and 0.3 kg of sunflower oil.

5 kg of chilled (or frozen) and finely chopped beef is added gradually and mixed with 5 kg of frozen whole milk, nonfat milk or emulsion in the cutter or other suitable apparatus. The required seasonings and salts are added to the homogeneous composition.

The product is processed further in the usual manner.

EXAMPLE 10

MP Product of Fine Wiener, Bologna, Extrawurst or Wiener Extra-Stangenwurst Type 2.8 kg of the emulsion, comprising 11 parts nonfat milk, 2.5 parts powdered nonfat milk and 0.15 parts of butter or oil is frozen to a temperature of from −10° C. to −20° C. and chopped more or less finely in the cutter. To this, 8.2 kg of meat mixture is added, comprising 5 kg of beef, 3.0 kg of nonfat milk (from 0.5 to 1.5% fat) and 200 g of nitrite pickling salt.

After complete homogenization in the cutter at temperatures of up to a maximum of 12° to 14° C., seasonings, glutamate, ascorbic acid and garlic are added in the usual amounts.

Filling is done into sterilized intestines, natural intestines, cans, jars or terrines. Cooking is done at temperatures of from 75° to 105° C. in a hot oven. Optionally, a gelatine topping can also be added, or the product can be wrapped in pastry dough.

EXAMPLE 11

MP Product in the Form of a Spread for Bread 2 kg of nonfat milk, 1 kg of powdered nonfat milk and 400 g of sunflower oil, butter or cod-liver oil or some other fat are homogenized in the cutter and frozen.

3.4 kg of this emulsion is homogenized in the cutter together with 1 kg to 2 kg of dried fruit powder (or 1 kg of dried fish powder or some other fish preparation) at temperatures of from 4° to 12° C. and preferably at 10° C.

Further processing is done as usual.

EXAMPLE 12

MP Product of Herb Paste Type

In the case of the emulsion here, 10 parts of whey or nonfat milk are mixed with 5 parts of powdered nonfat milk (optionally 0.5 parts of denatured lactalbumin) and 1.0 parts of sunflower oil and/or butter and frozen.

12 kg of the frozen emulsion thus produced were comminuted extremely finely in the cutter at temperatures below −10° C.

Then, a meat mixture chilled to about 10° C. and comprising 11 kg of beef, 3 kg of nonfat milk and 200 g of nitrite pickling salt was mixed in the cutter, and the entire composition was homogenized in a temperature range of from about 8° to a maximum of 14° C.

For seasoning, 75 g of ready-mixed seasoning, 40 g of glutamate and 40 g of ascorbic acid were used.

The operations of filling into sterile intestine or open containers, cooling and sterilization are done under the usual conditions.

4.5 kg of the frozen emulsion can also be finely chopped in the cutter and mixed with a basic meat mixture comprising 10 kg beef, 6 kg of low-fat skim milk and 400 g NPS. Further processing as above, with the addition of an herb-paste seasoning.

EXAMPLE 13

MP Product in the Form of a Spread for Bread for Use by Children

An emulsion is prepared from 119 kg nonfat milk 0.5 kg powdered nonfat milk, 2 kg butter and 100 g sunflower oil (or also cod-liver oil) and frozen.

4.5 kg of this frozen emulsion is finely chopped in the cutter and mixed with 500 g of soy, whole soy or nut flour or dried fruit powder, mixed with whole pieces of apple or pear, and processed and homogenized into a fine composition.

Further processing in the usual manner.

EXAMPLE 14

MP Product in the Form of a Spread for Bread Including Cocoa

From 3.5 kg of buttermilk, 1.5 kg of nonfat milk, 1.5 kg of powdered nonfat milk, 1.5 kg of butter and 100 g of sunflower oil or vitamin-enriched wheat germ oil, and emulsion is prepared and frozen. 6.5 kg of this emulsion is comminuted in the cutter and mixed with 200 g of sugar and 300 g of powdered cocoa, homogenized and processed into a uniform composition.

The emulsion can be partially replaced with milk ice (as described).

The consistency can be varied as described.

EXAMPLE 15

MP Product of Children's Spread with Half or One-Quarter Fat 3.8 kg of nonfat milk, 1 kg of powdered nonfat milk and 200 g of sunflower oil are homogenized in the processor and frozen.

2 kg of this emulsion is thickened at temperatures between −4° and −14° C. by the addition of 0.5 kg of powdered nonfat milk and then homogenized, and then mixed and thoroughly homogenized with 1500 g of butter or 1500 g of margarine or a mixture of 750 g of butter and 750 g of margarine. The proportion of the fat component can also be halved.

The composition is packed in jars, cans or the like and processed further in the usual manner.

EXAMPLE 16

MP Product of Liver Cream Type

In this example, an emulsion was used which was prepared from 5 kg of nonfat milk or whey, 2.5 kg of powdered nonfat milk and 360 kg of sunflower oil and/or butter.

4 kg of this emulsion were chilled or frozen to −4° C. and chopped extremely finely in the cutter together with 1 kg of liver, 200 g of onions and 100 g of sodium chloride or NP. The entire composition was thoroughly homogenized and seasoned, packed and cooked in the usual manner.

EXAMPLE 17

MP Products of Breakfast Spread or Luncheon Spread Type

In preparing this breakfast paste, first 7 kg of emulsion, comprising 5 kg of whole milk, 2 kg of powdered nonfat milk and 50 g of butter or sunflower oil was prepared and frozen.

The frozen emulsion composition is chopped to medium coarseness and in the cutter is finely mixed and homogenized with 5 g of nonfat milk and 5 kg of lean beef.

Instead of the 5 kg of beef, 2.5 kg of lean beef and 2.5 kg of pork can also be used. Also, game meat, poultry and the like can be used instead of the beef or beef and pork.

Further processing is done in the usual manner.

EXAMPLE 18

MP Products of Swiss Fleischkäs (meat cheese) Type

An emulsion is prepared from 5 kg of nonfat milk, 2.5 kg of powdered nonfat milk and 360 g of sunflower oil and frozen.

From 5 kg of lean beef, 1.5 kg of nonfat milk and 100 g NPS or sodium chloride, a basic meat mixture is prepared in the cutter and very well chilled or frozen.

This basic meat mixture and the frozen emulsion are mixed in the cutter and the homogeneous composition is mixed in the usual manner with 40 g of seasonings, 20 g of glutamate and 20 g of ascorbic acid.

Filling and further processing are performed as usual.

EXAMPLE 19

MP Product of Lemon Cream or Orange Cream Type

From 5 kg of milk, buttermilk or whey, 1.25 kg of powdered nonfat milk, 500 g of caseinate and 750 g of butter, a uniform emulsion is prepared and optionally frozen.

1 kg of this emulsion is process in the cutter together with 30 to 60 g of lemon or orange juice and 30 to 60 g of sugar at temperatures of from 8° to 18° C. to make a uniform composition, which is further processed as usual. Instead of the sacharose, fructose can also be used.

Roughage can be mixed in the usual manner.

Example 20

MP Product of Cottage Cheese/Honey Preparation 5 kg of milk, whey or water are mixed into a homogeneous mixture with 2.0 kg of powdered nonfat milk, 0.5 kg of butter and 100 g of lactalbumin. If the lactalbumin is omitted, a softer consistency can be attained.

1 kg of this emulsion is extremely finely mixed in the boiling cutter with lemon juice (2 to 5 lemons) and 100 to 200 g of honey and heated to temperatures between 10° and 108° C. Filling is done into jars, cans, cups or the like.

The above processing can also be done without the addition of honey. Honey is then added as a topping, and the containers are then closed.

EXAMPLE 21

MP Product of the Yogurt Product Type

An emulsion is prepared from 10 kg of milk, 2.5 kg of powdered nonfat milk, 1.5 kg of butter and optionally 500 g of lactalbumin and frozen.

10 g of this emulsion is mixed in the cutter with 1 to 2 kg of fresh yogurt at temperatures between 25° and 45° C. and further processed as usual.

Optionally, a starter culture of a desired bacterium (lactobacillus bulgaricus) can be gently added to the emulsion. Filling is done into jars or cups. The cooking can be done at 40° to 45° C., and the product is stored at 4° to 8° C.

EXAMPLE 22

Lemon-Yogurt Type of MP Product

An emulsion is prepared from 10 kg of milk, 5 kg of powdered nonfat milk and 0.5 kg of butter. This emulsion is frozen.

The above-produced emulsion, after the addition of the starter culture and after development is mixed in a large container, after the culture has developed completely, with 2 to 5% lemon juice and from 5 to 10% sugar (fructose) and well mixed. Optionally, gelating, pectin or the like can be added to this mixture to make it firmer.

Further processing is done as usual.

Instead of the emulsion, milk ice can be used in accordance with the invention.

EXAMPLE 23

Fruit-Pudding Type of MP Product

An emulsion is prepared from 2 kg of nonfat milk, 1 kg of powdered nonfat milk and 400 g of sunflower oil and/or butter and/or cod-liver oil and/or some other suitable fat. The homogenized mixture is frozen.

3 kg of the above-prepared emulsion is finely chopped in the cutter and mixed together with from 1 to 2% lemon juice (or citric acid or other fruit extracts, fruit concentrates and/or fruit flavorings), 2 to 3% sugar and 2 to 5% flavorings and homogenized.

This composition is then homogenized in a boiling cutter at temperatures of from 90° to 105° C. and then filled into containers and processed further as usual.

Optionally, finely ground fruit products, fruit parts or whole pieces of fruit can be mixed into the composition.

EXAMPLE 24

"High-Energy Paste" Type of MP Product

Here an emulsion was processed which comprised 10 parts of nonfat milk, $H_2O$ or whey, 5 parts of powdered nonfat milk and 2 parts of sunflower oil or butter or some suitable mixture, in terms of nutritional physiology, of vegetable and/or animal fats.

4 kg of this emulsion were frozen (to from $-10°$ to $-40°$ C.) and extremely finely comminuted in the cutter. To this, 4.2 kg of meat mixture was added, comprising 3 kg of beef, turkey, rabbit meat, game meat or mixtures thereof, 1 kg of nonfat milk or whole milk and 160 g of nitrite pickling salt or sodium chloride. To this homogenized composition, seasonings, glutamate, ascorbic acid and meat extract were added as needed and the composition was processed further in the usual manner.

To increase the protein and energy content, soy products and/or fish products or additional powdered nonfat or whole milk, protein extracts or suitable essential amino acids, lipid, lipoids, carbohydrates or other active ingredients can be mixed in.

In the usual manner, roughage such as wheat chaff or the like can be added to the mixture, as well as vitamins and/or minerals and trace substances, in an aqueous or organically bound phase.

EXAMPLE 25

Smoked-Fish Type of MP Product

For this, an emulsion is used which comprises 5 kg of nonfat milk or whey, 2.5 kg of powdered nonfat milk and 360 kg of sunflower oil and/or butter and 140 g of seasonings and salts. The emulsion can be partially or completely replaced by up to 8 kg of homogenized frozen nonfat and/or whole milk.

8 kg of this emulsion was frozen and extremely finely comminuted in the cutter and homogenized together with 1.5 kg of smoked, chilled fish and 100 g of sodium chloride. The proportion of fish can be raised or lowered arbitrarily.

Seasoning is done as desired and ascorbic acid and/or glutamate are optionally added. Filling and further processing are done by the usual methods.

EXAMPLE 26

MP Product of the Crustacean-Paste Type

In this example, a frozen emulsion and/or milk ice, as described in Example 25, is used, mixed with 1 kg of shrimp, prawn, crab or lobster meat or extracts or parts of these or or other sea animals (such as squid, octopus or the like). If desired, 500 g of beef or 500 g of pork or 250 g of beef and 250 g of pork can be mixed into this mixture, preferably while in the frozen state.

EXAMPLE 27

High-Performance MP Product

An emulsion is prepared from 20 parts of nonfat milk and/or whole milk, 33 parts of powdered nonfat milk and/or powdered whole milk, 2.5 parts of butter, 2.5 parts of sunflower oil, and 2.0 parts of cod-liver oil. This mixture is thoroughly homogenized and frozen.

A basic meat mixture is prepared from 10 parts of beef and/or fish, 10 parts of pork and/or game meat, 10 parts of poultry meat, 10 parts of nonfat milk and 200 g of table salt of nitrite pickling salt. This composition is thoroughly homogenized and very well chilled or frozen.

60 parts of the finely comminuted emulsion and 40 parts of the finely comminuted meat mixture are mixed thoroughly together in the cutter and then further processed as usual. Arbitrary portions of the emulsion and/or of the basic meat mixture can be replaced by other foods such as fish, cereals, dried fruit or vegetable powder, etc.

Seasoning can be done with soy extract and/or soup-meat extract. If table salt is used, blood plasma and/or beet extract and/or some similar natural coloring can be added in order to color the product.

In preparing both the above MP product and the products in the other examples, vitamins, minerals, trace substances and other active ingredients of every kind can naturally be added and mixed in at some suitable point in the process. The end product can be converted into a dried product or dried powder in a suitable, conventional manner.

EXAMPLE 28

Seasoned-Cheese Type of MP Product

An emulsion is prepared from 11 parts of nonfat milk, 2.5 parts of powdered nonfat milk, 1 part of sunflower oil and 0.5 parts of butter. This mixture is thoroughly mixed in the cutter and frozen.

16 parts of the above-prepared emulsions are finely comminuted and to them are added, in the boiling cutter at temperatures of from 4° to 40° C. (depending on the type of product to be prepared), 2 kg of Gruyere cheese pieces and/or 2 kg of Emmentaler cheese and/or 2 kg of some other type of hard or soft cheese, as well as seasonings, pepper, salts, garlic, wine, Kirschwasser and the like. This mixture is thoroughly emulsified and can be heated to various temperatures up to 100° C., depending on the type of product desired.

EXAMPLE 29

MP Products in the Manner of Meat Dumplings or Pancakes

An emulsion is prepared from 5 kg of milk, 2 kg of powdered nonfat milk and 500 g of butter and/or sunflower oil. This composition is thoroughly homogenized in the processor and frozen.

4 kg of the above-prepared frozen emulsion is finely comminuted in the cutter and 10 kg of lean beef, 6 kg of whole milk, 500 g of powdered nonfat milk, 80 g of seasonings, 40 g of glutamate and 200 g of sodium chloride are added and the composition is thoroughly mixed and processed further as usual.

EXAMPLE 30

Milk Preparations of the Diet Product Type

To prepare MP products, such as those given in the above examples, for various dietary requirements, the ingredients involved must be added in a modified form and process at appropriate stages in the process.

For instance, in order to obtain particularly low-fat modifications of the MP product, only frozen whole milk, low-fat milk, nonfat milk, mineral water, distilled water, buttermilk, or whey is used in the above-described Examples 1-29, instead of the emulsion ice and milk ice used in those examples. A further reduction of fat can be attained by using particularly lean meat, such as pork filet, beef filet, lean veal, lean game meat, lean poultry, various lean types of fish such as trout or ocean salmon and the like.

To this end, the frozen milk component of the basic emulsion, comprising nonfat milk, partially de-creamed milk or whole milk, is prepared first and then finely comminuted in the cutter.

1 to 9 kg of the frozen, comminuted basic emulsion is added in the processor to from 9 to 1 kg of the identifying ingredient, which is frozen or chilled or in the required state, and mixed in. The selected ration of the ingredients depends on the desired composition of the end product.

The identifying ingredient is prepared by grinding 10 kg of lean beef in a meat grinder and then homogenizing it in the processor and then chilling or freezing it. Depending on the kind of product desired, milk or drinking water can be poured in, preferably in amounts of from 5% to 40%.

Low-fat dietary modifications (such as for use in high blood pressure) are attained either by reducing the sodium chloride used to the desired degree or by using special or novel dietetic salts. Seasonings can be used to compensate for this in terms of the taste.

A particularly low-fat paste having 3.5% fat is prepared by mixing into 6 kg of a basic emulsion, prepared from whole milk, 4 kg of an identifying ingredient, which has been prepared from 80% very lean beef and 20% partially de-creamed milk (60 parts of milk ingredients and 32 parts of meat ingredients).

The carbohydrate portion can be modified for instance by using ultra-filtered milk or by adding the desired perishable and/or durable carbohydrates such as fructose, maltose, lactose, roughage, raw-fiber materials, hemicellulose or the like.

In the fat-modified dietary variants, monounsaturated or polyunsaturated fatty acids, for example, or a special mixture of cod-liver oil is also added and mixed in as needed, at the appropriate method step.

For dietary modifications used in geriatrics or pediatrics, appropriate measures should be taken in processing in terms of the ingredients and added substances used. In geriatrics, for instance, the need for electrolytes, proteins, calcium and iron should be taken into account.

In preparing pediatric modifications, the essential ingredients of the MP products and be optimally adjusted for reducing or largely preventing the possible consequences of overeating or faulty eating in children and young people. These modification options are naturally dependent on regional and social factors.

I claim:
1. A food product comprising the components of comminuted frozen emulsion particles and at least one member of identifying ingredients, selected in amounts such as to result in a product consisting essentially of
2% to 50% proteins, formed of meat or fish or vegetable or milk proteins,
2% to 25% lipids, formed of animal or vegetable lipids, and
2% to 25% carbohydrates, any remainder being water
wherein said identifying ingredients are selected from the group consisting of: meat, milk, fish, grain, fruit, nut, cheese, yoghurt, vegetable, butter, margarine, honey and cocoa products
wherein said comminuted frozen emulsion particles are obtained from a homogenized base emulsion of at least one member selected from the group con- sisting of: whole milk, nonfat milk, skimmed milk, buttermilk, powdered whole milk, powdered nonfat milk, whey and casein, and wherein said comminuted frozen emulsion particles have been prepared in a moving knife food cutter.

2. The product of claim 1, wherein said product contains 8% to 18% proteins, 2% to 9% lipids, 2% to 9% carbohydrates, and the remainder water.

3. A food product according to claim 1 wherein said lipids of the base emulsion are selected from the group consisting of animal oils, vegetable oils and fish oils.

4. A food product according to claim 1 wherein said base emulsion comprises nonfat milk.

5. A food product according to claim 1 having a calorie content of about 100 kcal/100 g;
   a fat content of about 3.5%; and
   a cholesterol content of about 30–50 mg/100 g;
   said food product consisting essentially of about 40 parts of said identifying ingredients,
   which identifying ingredients are in form of intimately mixed frozen particles,
   and of about 60 parts of said comminuted frozen emulsion particles;
   wherein said identifying ingredients comprise about 80% meat having about 2–4% fat content and about 20% lowfat milk having a fat content of between about 0.5% and 1.5% and
   wherein said homogenized base emulsion comprises frozen milk having up to 3.5% fat content.

6. A food product according to claim 1, wherein at least a portion of said comminuted frozen particles have been comminuted in a vacuum cutter.

7. A food product according to claim 1 wherein at least a portion of said comminuted frozen particles have been comminuted in a freezing cutter.

8. A food product comprising the components of comminuted frozen emulsion particles, at least one member of identifying ingredients,
   and at least one member selected from the additional group consisting of spices, flavorants, vitamins, minerals, and roughage, said components being selected in amounts such as to result in a product consisting essentially of
   2% to 50% proteins, formed of meat or fish or vegetable or milk proteins,
   2% to 25% lipids, formed of animal or vegetable lipids, and
   2% to 25% carbohydrates, any remainder being water
      wherein said identifying ingredients are selected from the group consisting of: meat, milk, fish, grain, fruit, nut, cheese, yoghurt, vegetable, butter, margarine, honey and cocoa products
      wherein said comminuted frozen emulsion particles are obtained from a homogenized base emulsion of at least one member selected from the group consisting of: whole milk, nonfat milk, skimmed milk, buttermilk, powdered whole milk, powdered nonfat milk, whey and casein,
      wherein said comminuted frozen emulsion particles have been prepared in a moving knife food cutter; and
      wherein said member of the additional group is incorporated into said base emulsion or said identifying ingredient.

9. A food product comprising the components of comminuted frozen emulsion particles, at least one member of identifying ingredients,
   and at least one member selected from the further group consisting of starter cultures of lactic acid bacteria and food grade acidifying agents, said components being selected in amounts such as to result in a product consisting essentially of
   2% to 50% proteins, formed of meat or fish or vegetable or milk proteins,
   2% to 25% lipids, formed of animal or vegetable lipids, and
   2% to 25% carbohydrates, any remainder being water
      wherein said identifying ingredients are selected from the group consisting of: meat, milk, fish, grain, fruit, nut, cheese, yoghurt, vegetable, butter, margarine, honey and cocoa products
      wherein said comminuted frozen emulsion particles are obtained from a homogenized base emulsion of at least one member selected from the group consisting of: whole milk, nonfat milk, skimmed milk, buttermilk, powdered whole milk, powdered nonfat milk, whey and casein,
      wherein said comminuted frozen emulsion particles have been prepared in a moving knife food cutter; and
      wherein said member of the further group is incorporated into said base emulsion.

10. A process for preparing a food product which comprises the steps of:
    step a): preparing, in a cutter, a homogenized base emulsion of at least one member selected from the group consisting of whole milk, nonfat milk, partially skimmed milk, buttermilk, powdered whole milk, powdered nonfat milk, whey and casein in the absence of any chemically processed starting ingredients or additives and in the absence of binders;
    step b): freezing the base emulsion thus prepared;
    step c): comminuting, in a moving knife-type cutter, the frozen base emulsion to obtain comminuated particles; and
    step d): thoroughly and intimately admixing said comminuted frozen base emulsion particles with particles of at least one member of identifying ingredients selected from the group consisting of meat, fish, grain, fruit, nut, cheese, yogurt, vegetable, butter, margarine, honey, and cocoa products,
    wherein said steps a), b), c) are carried out in the sequence of
    a), b), and c) and wherein step d) is carried out at least in part concurrently with step c).

11. A process according to claim 10 which includes the step of thoroughly chilling or freezing said member of the identifying ingredients prior to said admixing in step d).

12. A process according to claim 10 which includes the step of comminuting said member of the identifying ingredients prior to said admixing in step d).

13. A process according to claim 10 wherein said emulsion includes at least one member selected from the product group consisting of animal, vegetable and fish oils; and
    wherein the ratio in said emulsion of said milk product group member to said oil product member is from 1:99 to 99:1.

14. A process according to claim 10 wherein said food product, after said step d), is further processed by at least one of: cooking; smoking.

15. A process according to claim 10 wherein said thorough admixing step d) of said member of identifying ingredients is carried out at a temperature of from +10° to −20° C.

16. A process according to claim 10 wherein said food product, after step d), is further processed by drying.

17. A process according to claim 10 wherein said comminuting step a) and said admixing step c) are carried out in a single processor.

18. A process according to claim 10, wherein both said comminuting steps a) and c) are carried out in a moving knife-type processor.

19. A process according to claim 10, wherein at least one of said comminuting step (a) and said comminuting step (c) is carried out in a vacuum processor.

20. A process according to claim 10, wherein at least one of said comminuting step (a) and said comminuting step (c) is carried out in a freezing processor.

* * * * *